United States Patent [19]

Cassel

[11] Patent Number: 4,813,720

[45] Date of Patent: Mar. 21, 1989

[54] BAND CLAMP WITH IMPROVED CLAMPING ARRANGEMENT

[75] Inventor: Scott T. Cassel, Birmingham, Mich.

[73] Assignee: BKS Company, Birmingham, Mich.

[21] Appl. No.: 214,896

[22] Filed: Jun. 29, 1988

Related U.S. Application Data

[63] Continuation of Ser. No. 931,680, Nov. 17, 1986, abandoned.

[51] Int. Cl.[4] ............................................. F16L 21/06
[52] U.S. Cl. ..................................... 285/419; 285/424
[58] Field of Search ................ 285/373, 419, 420, 424

[56] References Cited

U.S. PATENT DOCUMENTS

| Re. 30,042 | 7/1979 | Hiemstra et al. | |
| 2,690,193 | 9/1954 | Smith | 285/373 X |
| 4,142,743 | 3/1979 | McGowen et al. | |
| 4,312,526 | 1/1982 | Cassel . | |
| 4,364,588 | 12/1982 | Thompson | 285/419 |
| 4,408,788 | 10/1983 | Beukema | 285/419 |
| 4,463,975 | 8/1984 | McCord . | |

Primary Examiner—Dave W. Arola
Attorney, Agent, or Firm—Reising, Ethington, Barnard, Perry & Milton

[57] ABSTRACT

A band clamp for pipe joints is disclosed and comprises a band which has confronting end flanges when wrapped around the pipes. A clamping mechanism is provided for pulling the end flanges together and stretching the band around the pipes. The clamping mechanism includes a pair of force bars outboard of the end flanges and a spline with concave surfaces on opposite sides, the spline being disposed between the end flanges. A pair of bolts extend through bolts holes in the force bars, end flanges and spline and nuts thereon are tightened to draw the flanges against the spline and stretch the band around the pipes. Oversize bolt holes in the flanges allow the force bars to move translationally and angularly relative to the flanges. One force bar and the spline are held captive with one end flange by the bolts which extend therethrough into a press fit with the spline.

8 Claims, 1 Drawing Sheet

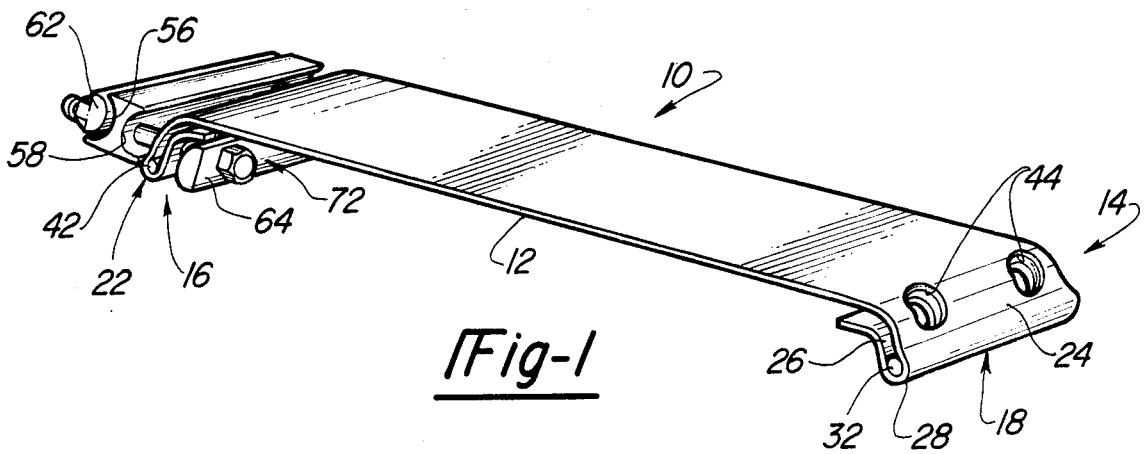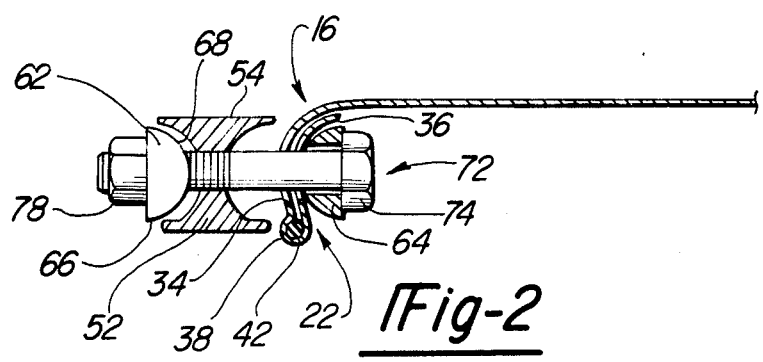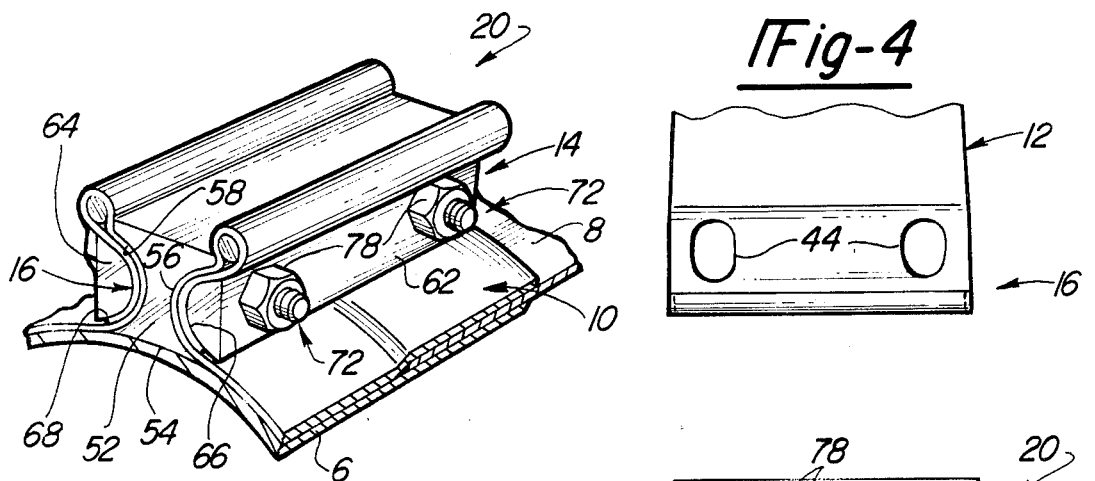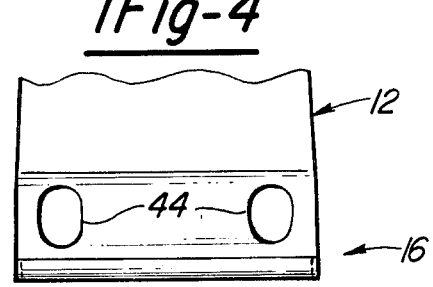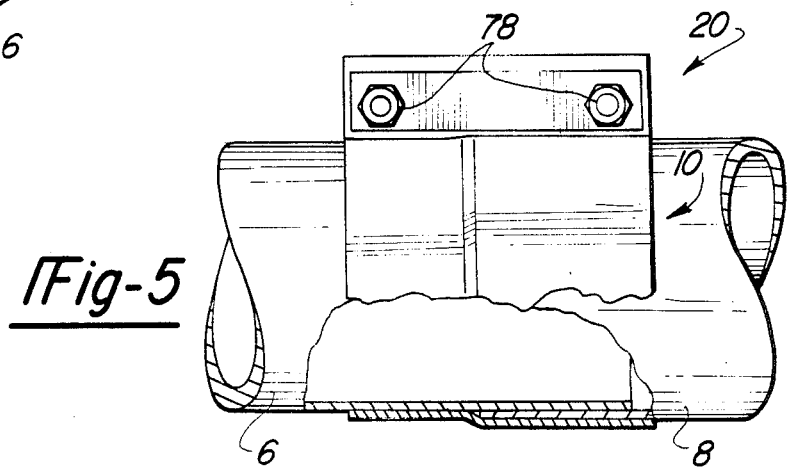

BAND CLAMP WITH IMPROVED CLAMPING ARRANGEMENT

This application is a continuation of application Ser. No. 931,680, filed Nov. 17, 1986 and now abandoned.

FIELD OF THE INVENTION

This invention relates to pipe couplings and more particularly it relates to an improved clamping arrangement for pipe couplings of the open sleeve type.

BACKGROUND OF THE INVENTION

There are many applications for pipe couplings where it is desired to couple two pipes together in a strong mechanical connection with a substantially fluid tight seal. A particular application for which the subject invention is especially adapted, is that of pipe joints in vehicle exhaust systems. In such an application, the pipe joints may be formed with abutting pipe ends to form a butt joint or pipes which are telescopically joined with overlapping ends to form a lap joint. In either type of joint, it has become a common practice to utilize a wide band clamp formed of sheet metal which is wrapped around the pipes to span the juncture between the pipes with the band being stretched around the pipes in close conformity therewith to form a good seal. Because of the relatively high temperature and mechanical stresses which occur in vehicle exhaust systems, the clamp band must be fabricated from a suitable grade of steel to provide the requisite strength for a long period of service. In some applications, such as heavy duty truck exhaust systems, the flat band clamp must join relatively large diameter pipes. One of the pipes may take the form of a flexible metal pipe having spiral corrugations while the other pipe may take the form of a rigid pipe which is joined therewith in either a butt joint or lap joint. In order to obtain intimate contact of the band with both pipe ends throughout its circumference for providing a good seal, it is necessary to subject the band to high tensile stress beyond the yield point or elastic limit. In applications where the band is of heavy gauge sheet metal, very large forces must be produced to provide the desired stretching of the band. Further, in some pipe joints of this type, one or both pipes will be either oversize or undersize, i.e. have an outside diameter which is either greater or smaller within certain tolerances than the nominal or mill diameter of the pipe. There is a need for a clamping mechanism capable of producing very high tensile forces on the band and yet which is easy to manipulate and tighten and which is adaptable to either undersize or oversize pipes.

The pipe coupling of this invention is an improvement upon the pipe coupling disclosed and claimed in U.S. Pat. No. 4,312,526 granted Jan. 26, 1982 to Thomas R. Cassel. In this patent a pipe coupling is disclosed for installation of pipes which are already butted or telescoped together. The coupling comprises a band clamp of the open sleeve type which is pre-formed into generally circular shape with end flanges at each end of the band for attachment with the clamping mechanism which stretches the band around the pipes. The clamping mechanism disclosed in this patent is capable of developing very large tensile forces on the band. In general, it comprises a spline having opposite concave surfaces disposed between the end flanges, a pair of force bars each having convex surfaces adapted to mate with the concave surfaces of the spline and disposed outboard of the respective end flanges. A pair of bolts extend through the force bars, flanges and spline for drawing the flanges inwardly against the spline and thus stretching the band around the pipes. The length of the band together with the end flanges in the clamping mechanism is such that when the bolts are fully tightened so that the end flanges are bottomed-out or seated against the concave surfaces of the spline, the band is stretched to the desired degree around the pipes.

The Hiemstra et al patent U.S. Pat. No. Re. 30,042 reissued July 10, 1979 discloses a pipe coupling which comprises a sheet metal band provided with reinforcing plates at each end with bolts extending through the plates to draw them together and stretch the band around the ends. The sheet metal of this coupling is in the form of a flat band with out-turned flanges which is wrapped around the pipe ends to bring the flanges in confronting relationship.

Other band clamps of this type are disclosed in the McGowen et al U.S. Pat. No. 4,142,743 granted Mar. 6, 1979 and in the McCord U.S. Pat. No. 4,463,975 granted Aug. 7, 1984.

A general object of this invention is to overcome certain disadvantages of the prior art.

SUMMARY OF THE INVENTION

In accordance with this invention, an improved open sleeve band clamp is provided for coupling two pipes in either a butt joint or a lap joint. The invention provides an improved clamping arrangement which is capable of developing very large tensile forces in the band and, during tightening, allows adjusting of the clamping mechanism relative to the band. The clamp is easy to install and tighten on pipes which are already butted or telescoped together.

The band clamp of this invention comprises a metal band wrapped around the ends of two pipes with the opposite ends of the band turned outwardly to form first and second end flanges. A spline is disposed between the end flanges and has a pair of concave surfaces on opposite sides. First and second bars each having a convex surface are disposed with their convex surfaces against the first and second end flanges, respectively, and opposite the respective concave surfaces of the spline. Each of the end flanges has a retaining means at the free edge for trapping it between the spline and the respective bar. A bolt extends through bolt holes in the end flanges, spline and bars whereby the band may be stretched by tightening a nut on the bolt to draw the bars together and force the end flanges against the concave surfaces of the spline. The bolt holes in the end flanges are oversize and have a dimension in a direction transversely of the width of the band which is substantially larger than the diameter of the bolt whereby the bars spline and bolt are angularly and laterally displaceable relative to the end flanges within the limits of the bolt holes in the end flanges. Preferably, the bolt holes in the end flanges have a smaller dimension in the width direction of the band than in the direction transversely of the width direction.

Further, in accordance with the invention, the bolt hole in the spline is of a dimension to provide a press fit for the bolt. The bolt is disposed through the first bar and the first end flange and the spline to retain them in a captive relationship with each other before the bolt is extended through the second end flange.

A complete understanding of this invention may be obtained from the detailed description that follows taken with the accompanying drawings.

DESCRIPTION OF THE DRAWINGS

FIG. 1 is a perspective view of the band clamp of this invention as it is supplied for installation;

FIG. 2 shows a side view of one end of the clamp as it is supplied for installation;

FIG. 3 is a fragmentary perspective view of the clamping mechanism after it is installed on a pipe joint;

FIG. 4 shows the bolt holes in one end flange of the band clamp; and

FIG. 5 is an elevation view showing the band clamp of this invention in a pipe joint.

BEST MODE FOR CARRYING OUT THE INVENTION

Referring now to the drawings, there is shown an illustrative embodiment of the invention in a band clamp which is adapted for use in making a coupling between the ends of two pipes in either a butt joint or a lap joint. Further, in the illustrative embodiment, the band clamp is especially adapted for installation on pipes which are already butted or telescoped together, as in the case of a replacement clamp for a vehicle exhaust system. It will be appreciated, however, that the invention is useful in a wide variety of applications.

Before considering the detailed structure of the band clamp of this invention, it will be helpful to consider the clamp installed in a pipe joint as shown in FIGS. 3 and 5. The band clamp, in general, comprises the band 10 and a clamping mechanism 20. It is installed on a pair of pipes 6 and 8 which are assembled in a lap joint with the pipe 6 being telescoped into pipe 8. It is noted that as shown in FIGS. 3 and 5, the clamping mechanism 20 is fully tightened and the band 10 is stretched around the pipes in close conformity therewith. The parts of the band clamp and its manner of assembly and installation will now be described.

Referring now to FIGS. 1 and 2, the band 10 is shown with the parts of the clamping mechanism 20 all attached to one end of the band for purposes of shipping and handling. It will be understood that the parts will have to be rearranged, as described below, to install the clamp onto the pipes. The clamp comprises a metal band 10 which has a flat band section 12 and a pair of opposite end flanges 14 and 16 which are unitary with the flat band portion 12. The band 10 is preferably made of a selected grade of sheet steel. It is desirable to use a material which is capable of undergoing a relatively high degree of elongation without rupture. For example, aluminized steel is satisfactory for some application. In other applications requiring a higher degree of elongation, stainless steel may be used. A steel known as "ALUMA-TI", available from the Inland Steel Company, exhibits an elongation property intermediate that of aluminized steel and stainless steel and is suitable for many application. The overall length of the band 10 is, of course, determined by the size of the pipes to be coupled together and by the desired degree of stretching of the band. In this connection, it is to be noted that the actual outside diameter of mass produced pipes varies, within certain tolerances, from the nominal or mill dimension and a given pipe may be either slightly oversize or undersize. This variation in outside diameter, is taken into account in designing the length of the band for a given nominal pipe size. Nevertheless, as will be discussed below, this variation does present a problem in making the installation of the band clamp onto the pipes. The width of the band 10 may vary from one application to another depending upon several factors including the thickness and strength properties of the metal from which the band is made as well as the desired degree of sealing to be achieved by the coupling and the mechanical strength of the coupling. It is further noted, in making a butt joint between two pipes, that the outside diameters of the pipes are the same, subject to the tolerance variations mentioned above. In the case of a lap joint, where one pipe end is telescoped into the other, the outside diameters are necessarily different from each other by twice the wall thickness of the outer pipe. In either case, the two pipes are referred to herein as having substantially the same diameters.

The end flanges 14 and 16 are unitary with the sheet metal of the flat portion 12 of the band 10. The end flanges 14 and 16 are turned outwardly from the flat portion 12. The end flange 14 terminates at its outer or free edge in a support or retaining member 18 and the flange 16 terminates at its free edge in a retaining member 22. The end flanges 16 and 18 are preferably constructed with a double layer of the sheet metal and are pre-formed with an arcuate cross-section. In flange 14, the double layer comprises an inner layer 24 which is a continuation of the flat portion 1 and outer layer 26 which is formed by folding the sheet metal back on itself around a loop or bight 28. The bight 28 is preferably formed circular in cross-section and forms a cylindrical passage which receives a cylindrical rod 32. Thus, the retaining member 18 is comprised of the bight 28 and the rod 32 and has a thickness greater than that of the double wall of the end flange 14. The end flange 16 is of the same construction as end flange 14 and comprises an inner layer 34, an outer layer 36, a bight 38 and a rod 42. The end flange 14 is provided with a pair of spaced bolt holes 44 each of which extends through the double wall thickness, i.e. outer wall 26 and inner wall 24. Similarly, the end flange 16 is provided with a pair of spaced bolt holes 44 which extend through the inner wall 34 and the outer wall 36. The shape of the bolt holes in the end flanges 14 and 16 will be described subsequently in conjunction with the clamping mechanism 20.

Although the intermediate band portion 12 is described above as being flat, it will be understood that it may also be pre-formed in other configurations. For example, it may be pre-formed into a generally circular configuration such as that shown in the afore mentioned Cassel U.S. Pat. No. 4,312,526, and supplied to the user in such form. Also, it may be pre-formed with an arcuate configuration in the central region so that it approximately conforms to the contour of the pipes to be joined and thereby facilitates locating and bending the band around the pipes while still retaining a generally flat configuration for packaging purposes.

In order to stretch the band 10 around the pipes to be coupled, a force applying means in the form of clamping mechanism 20 is provided to pull on the end flanges 14 and 16 after the band 10 is wrapped around the pipes. The clamping mechanism 20 will be described with reference to FIGS. 3 and 5. The mechanism 20 comprises a reaction member or spline 52 which is disposed between the end flanges 14 and 16 and which is adapted to seat upon the outer surface of the walls of pipes 6 and 8. The spline 52 has an inner surface 54 of arcuate configuration conforming to the outer walls of the pipes This surface of the pipe may be provided with a coating of sealing compound if desired to enhance the fluid seal of the coupling. The spline 52 is provided with a pair of oppositely facing concave surfaces 56 and 58 which extend longitudinally of the spline and are adapted to receive the end flanges 14 and 16, respectively, thereagainst.

The clamping mechanism 20 also comprises a pair of spacers or force bars 62 and 64. The force bar 62 has a convex surface 66 which is disposed outside the end flange 14 opposite the concave surface 56 of the spline 52. Similarly, the force bar 64 has a convex surface 68 which is disposed outside the end flange 16 opposite the concave surface 58 of the spline 52. The convex surfaces 66 and 68 of the force bars are preferably in the form of a circular arc in cross-section with a radius smaller than the radius of the concave surfaces 56 and 58 on the spline by an amount approximately equal to the thickness of the end flanges. The clamping mechanism 20 also includes a pair of bolts 72 which are identical to each other. Each bolt 72 is provided with a head 74 at one end and a shank 76 which is at least partly threaded from the other end. Each bolt is provided on the threaded end with a nut 78. The force bars 62 and 64 and the spline 52 are provided with a pair of spaced bolt holes which are disposed in alignment with each other and in alignment with the bolt holes 44 in the end flanges 14 and 16. Each bolt 72 extends through the respective bolt holes with the head 74 thereof seated against the force bar 62 and the nut 78 is threaded on the bolt and seated against the force bar 66. When the nuts are tightened onto the bolts to the specified torque, the end flanges 14 and 16 are drawn inwardly by the force bars 62 and 64 into engagement with the spline 52. This causes the retaining members 22 and 18 to be pulled into engagement with the respective bars 64 and 66 and the spline 52. It is noted that the concave surfaces 56 and 58 of the spline have a surface configuration which forms a continuation of the outer surfaces of the pipes without abrupt change of direction. Accordingly, tensile force in the end flanges 14 and 16 is transmitted to the band portion 12 without undue stress concentration.

In accordance with this invention, the bolt holes 44 in the end flanges 14 and 16 are oversize holes for the bolts 72, for reasons which will be discussed subsequently. Before describing the size and shape of the bolt holes 44, it is noted that the bolt holes in the force bars 62 and 64 are preferably of such size relative to bolts 72 so as to provide a conventional clearance fit, i.e. the minimum hole diameter which will permit the bolt to be easily inserted without interference or binding. As described above, the bolt holes in the spline 52 are of such size as to provide an interference or press fit with the bolts 72. This is for the purpose of providing a captive relationship of the bolts 72, spline 52 and force bar 64 with the end flange 16. This minimizes the number of parts that the installer has to handle in making the installation. In this captive relationship, as shown in FIG. 2, it is desirable to have the force bar 62 and the spline 52 spaced far enough apart that there is easy freedom of movement of the end flange 16 on the bolt 72.

The oversize holes 44 in both end flanges 14 and 16 are of the same size and shape. As shown in FIGS. 1 and 4, the bolt holes 44 are slotted or elongated in the direction transverse to the width dimension of the respective end flange. The dimension in this direction is herein referred to as the major dimension and the dimension in the width direction of the end flange is herein referred to as the minor dimension. The minor dimension is preferably just large enough to provide a clearance fit with the bolt 72 thereby leaving a maximum amount of material in the width direction of the end band for maximizing the tensile force which the end flange can sustain. The major dimension of the bolt holes 44 is substantially larger than the minor dimension and hence it is substantially larger than the bolt diameter. In practice, it is found that the major dimension should be at least fifteen percent larger than the bolt diameter. This permits free play of the bolts 72 in the end bands sufficient to accommodate both undersize and oversize pipes by allowing variability of the effective length of the band 10. Further, the oversize holes 44 permit independent movement of the force bars 62 and 64 relative to the end flanges 16 and 14, respectively. As a result, when the bolts 72 are tightened, the force bars tend to rotate so as to maintain the flat face thereof perpendicular to the axis of the bolts. This tends to minimize bending stresses on the bolts. Also, the oversize holes 44 make it much easier to insert the threaded ends of the bolts 72 into the oversize bolt holes 44 in the end flange 14.

It will be appreciated from the above description that the flat band clamp which is supplied in the form as shown in FIGS. 1 and 2 includes all of the parts needed for installing the clamp on pipes 6 and 8 as shown in FIGS. 3 and 5. It is noted that, as shown in FIGS. 1 and 2, the force bar 66 and nuts 78 are loosely assembled on the bolts 72.

The installation of the flat band clamp is accomplished as follows. First, the nuts 78 as shown in FIG. 1 are removed from the bolts 72 and the force bar 62 is removed from the bolts. Then, the band 10 is bent around the pipe ends of pipes 6 and 8 with the band spanning the juncture of the pipe ends. The flange 16 carries with it the sub-assembly of the force bar 64, the two bolts 72 and the spline 52 which are held captive thereon. The end flange 14 is brought into confronting relationship with the concave surface of the spline 52 and the threaded ends of the bolts 72 are extended through the bolt holes 44 in the end flange 14. Then, the force bar 62 is placed against the end flange 14 with the bolts 72 extending through the bolt holes in the bar 62. Next, the nuts 78 are threaded onto the respective bolts 72 and with the band 10 properly located over the pipe ends, the nuts 78 are tightened. By reason of the oversize bolt holes in both end flanges the sub-assembly of bolts 72, force bar 64 and spline 52 may be tilted and moved transversely relative to the end flanges 14 and 16 to facilitate entry of bolts 72 into the bolt holes in end flange 14. In the case of an oversize pipe, the fitting of the band 10 around the pipes is facilitated because the elongated bolt holes 44 permit the bolts 72 to move radially outwardly of the pipes to the limit of the bolt holes thus effectively enlarging the length of the band 10 available for wrapping around the pipes. As a final step in installing the band clamp, the nuts 78 are tightened on the respective bolts and the force is applied to the end flanges 14 and 16 to draw them toward engagement with the concave surfaces 56 and 58 of the spline 52. During this tightening procedure, the force bars 62 and 66 are able to change angularity relative to the respective flanges 14 and 16 by reason of the elongated bolt holes 44 and the bars tend to rotate so that the flat faces thereof are perpendicular to the bolts. As a result, bending stresses in the bolts are reduced and the bolts are capable of developing greater tensile force for clamping the flanges 14 and 16 against the spline 52.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A band clamp for use in making a coupling between the ends of two round pipes comprising:
    a metal band having its opposite ends bent to form a first and second end flange, said band being disposed around said pipes with said end flanges extending radially of said pipes and confronting each other,
    a spline extending axially of said pipes and disposed between said end flanges with a pair of surfaces opposite the respective end flanges, at least one of said surfaces defining an axially extending groove with an arcuate cross-section,
    a bar having a convexly arcuate surface disposed opposite said groove with said first end flange therebetween,
    force exerting means having a surface disposed opposite the other surface of said spline with said second end flange therebetween,
    a retaining means on each end flange for trapping it between the spline and the respective bar and force exerting means,
    each of said end flanges, bar and spline having a bolt hole therethrough,
    a bolt extending through said bolt holes and threadedly engaging said force exerting means,
    the bolt hole in each of said end flanges being an overside bolt hole with a dimension in the radial direction which is substantially larger than the diameter of the bolt,
    said bar, spline and force exerting means being held in fixed relation with each other in the radial direction by said bolt throughout tightening of said bolt and being angularly movable as a unit with said bolt being movable within the bolt hole relative to said end flanges during said tightening,
    whereby bending stresses are minimized in said bolt when it is tightened to draw said bar and force exerting means together and thereby cause the end flanges to be drawn against the spline and the retaining members to be trapped between the spline and the respective bar and force exerting means.

2. The invention as defined in claim 1 wherein said oversize bolt holes in said end flanges have a smaller dimension in the axial direction than in the radial direction.

3. The invention as defined in claim 1 wherein said oversize bolt holes are at least fifteen percent larger in the radial direction than the diameter of said bolt.

4. The invention as defined in claim 1 wherein said band and said end flanges comprise a unitary piece of sheet metal and each of said end flanges is folded back on itself to provide a double layer of sheet metal.

5. The invention as defined in claim 4 wherein each of said retaining means comprises a rod disposed inside the fold of the respective end flange.

6. The invention as defined in claim 1 wherein said arcuate surface of said spline is an approximate circular arc and wherein the arcuate surface of said bar is an approximate circular arc.

7. The invention as defined in claim 1 wherein each of said pair of surfaces defines an axially extending groove with an arcuate cross-section, said force exerting means comprises a second bar having a convexly arcuate surface opposite the groove in the other surface of said spline and a nut which is threadedly engaged with said bolt adjacent said second bar.

8. The invention as defined in claim 7 wherein each of said bars and spline have another bolt hole therethrough, said flanges have another oversize bolt hole therethrough the last-mentioned bolt holes being aligned with each other, and another bolt extending through the last-mentioned bolt holes and another nut on the last-mentioned bolt.

* * * * *